United States Patent
Ding et al.

(10) Patent No.: US 10,346,685 B2
(45) Date of Patent: Jul. 9, 2019

(54) SYSTEM AND METHOD FOR DETECTING AND TRACKING A MOVING OBJECT

(71) Applicant: SHANGHAI XIAOYI TECHNOLOGY CO., LTD., Shanghai (CN)

(72) Inventors: Dajun Ding, Shanghai (CN); Lili Zhao, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 100 days.

(21) Appl. No.: 15/212,761

(22) Filed: Jul. 18, 2016

(65) Prior Publication Data

US 2018/0005033 A1 Jan. 4, 2018

(30) Foreign Application Priority Data

Jun. 29, 2016 (CN) .......................... 2016 1 0498023

(51) Int. Cl.
*G06K 9/00* (2006.01)
*G06T 7/254* (2017.01)

(52) U.S. Cl.
CPC .......... *G06K 9/00624* (2013.01); *G06T 7/254* (2017.01); *G06T 2207/10004* (2013.01); *G06T 2207/20021* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 9,412,269 B2 * | 8/2016 | Saptharishi | G08G 1/0133 |
| 2006/0243798 A1 * | 11/2006 | Kundu | G06Q 20/00 |
| | | | 235/383 |
| 2008/0100721 A1 * | 5/2008 | Ayaki | H04N 5/232 |
| | | | 348/222.1 |
| 2016/0260226 A1 * | 9/2016 | Yano | G06T 7/208 |

FOREIGN PATENT DOCUMENTS

| | | | |
|---|---|---|---|
| CN | 102360423 | * | 2/2012 |
| CN | 102360423 A | | 2/2012 |
| CN | 104539890 | * | 4/2015 |
| CN | 104539890 A | | 4/2015 |
| JP | 2017022527 A | * | 1/2017 |

OTHER PUBLICATIONS

Huaizong Liang et al., "Application of the Human Tracking Method in Video Interaction Based on Background Subtraction," pp. 352-57, dated Oct. 31, 2008.

* cited by examiner

*Primary Examiner* — Delomia L Gilliard
(74) *Attorney, Agent, or Firm* — Cantor Colburn LLP

(57) ABSTRACT

A device includes a memory configured to store instructions and a processor configured to execute the instructions to obtain image data of a region of interest included in an image frame. The processor may also be configured to compare the image data of the region of interest with image data of a background to detect a change in the region of interest. The processor may further be configured to detect the object in image frame based on the detected change.

20 Claims, 9 Drawing Sheets

SYSTEM AND METHOD FOR DETECTING AND TRACKING A MOVING OBJECT

CROSS-REFERENCE TO RELATED APPLICATIONS

This application is based upon and claims the benefit of priority from Chinese Patent Application No. 201610498023.9, filed on Jun. 29, 2016, the disclosure of which is expressly incorporated herein by reference in its entirety.

TECHNICAL FIELD

The present disclosure generally relates to computer vision technology, and more specifically, to systems and methods for detecting and tracking a moving object from one or more image frames.

BACKGROUND

With the advancement of technologies and increased demand, video surveillance technologies have been rapidly developed and widely used in a variety of areas, such as smart surveillance and transportation. Video surveillance refers to any technology that utilizes cameras or other imaging sensors to capture one or more images of an environment, and performs image analysis to identify objects and/or obtain information for various purposes. Detection and tracking of moving object is an important subject of computer vision research. Technical advancement and implementations of moving object detection and tracking have attracted a lot of attention in the society.

Traditional techniques for detecting a moving object include: optical flow-based methods, frame difference-based methods, background difference- or subtraction-based methods, methods based on color tracking (e.g., meanshift), and object detecting and tracking methods based on pattern recognition.

Optical flow-based methods use characteristics of optical flows (e.g., pixel movement vectors derived from images captured overtime) to detect and track moving objects. However, optical flow-based methods require complex computation. In addition, optical flow-based methods are sensitive to signal noise. Such methods require high computational capacity in order to realize real time detection and tracking of moving objects.

Frame difference-based methods detect areas of movement in two or three image frames that are consecutively obtained over time, based on difference methods. Such methods are relatively simple and insensitive to changes in light in the scenes. However, it is easy to have void space in the detected moving object. As a result, the detected area of movement tends to be incomplete.

Background difference or subtraction methods have been frequently used in motion detection. Such methods calculate the difference between a present image frame and a background image (or image frame) to obtain an area of movement. Such methods generally produce a complete area of movement. However, such methods may be sensitive to changes in light and scene, and may exhibit noise in the result, which may limit the effectiveness of such methods.

Examples of methods based on color tracking include meanshift and camshift methods. Camshift methods use histogram model of colors of an object to obtain a back projection model, thereby converting image data to a probability distribution plot of colors, and enabling tracking based on colors. Meanshift methods are non-parametric methods based on density function gradient. Such methods locate an object in the image data by finding the extreme values of a probability distribution through iteration. These methods use the color of an object as the primary information for tracking, and are fast and effective for tracking a single-color moving object. However, these methods are sensitive to color. For example, when the background includes objects that have colors close to the color of the moving object, these methods may mistakenly track the objects in the background.

Object detecting and tracking methods based on pattern recognition learn characteristics of the object to be tracked in advance, and then detect the object from the images based on the characteristics learned in advance. These methods are effective for certain moving objects, such as pedestrians, vehicles, etc. However, the computation requirement of these methods is large, which places a high load on processing hardware.

The disclosed methods and systems address one or more of the problems listed above. For example, the disclosed methods and systems can accurately, quickly, and effectively detect a moving direction of an object from the images, and start tracking the moving object.

SUMMARY

Consistent with one disclosed embodiment of the present disclosure, a device is provided. The device may include a memory configured to store instructions and a processor configured to execute the instructions to obtain image data of a region of interest included in an image frame. The processor may also be configured to compare the image data of the region of interest with image data of a background to detect a change in the region of interest. The processor may be further configured to detect the object in image frame based on the detected change.

Consistent with another disclosed embodiment of the present disclosure, a method for detecting an object is provided. The method may include obtaining image data of a region of interest included in an image frame. The method may also include comparing the image data of the region of interest with image data of a background to detect a change in the region of interest. The method may further include detecting the object in image frame based on the detected change.

Consistent with yet another disclosed embodiment of the present disclosure, a non-transitory computer-readable medium is provided. The non-transitory computer-readable medium may store instructions that, when executed by a processor, cause the processor to perform a method for detecting an object. The method may include obtaining image data of a region of interest included in an image frame. The method may also include comparing the image data of the region of interest with image data of a background to detect a change in the region of interest. The method may further include detecting the object in image frame based on the detected change.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodi

DETAILED DESCRIPTION

The disclosed embodiments provide a computer-vision based system and method for detecting an object, such as a moving object, from image frames captured by a camera. The disclosed embodiments may detect the moving object and track the moving object in real time. The disclosed embodiments may detect and track the moving object from the image frames in an accurate, fast, and efficient manner. In addition, the disclosed system and method may achieve simultaneous monitoring of a certain area in an environment, and detecting and tracking a moving object in that area. Thus, the disclosed system may eliminate the needs to set up two different systems, one for monitoring the area, and one for detecting and tracking a moving object in that area. Furthermore, the disclosed method may be implemented as an algorithm that requires a small memory size and a low computational cost. Accordingly, the disclosed methods may be implemented in an embedded system, such as a vehicle, a wearable device, an airplane, etc., which do not have a large computational capacity.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
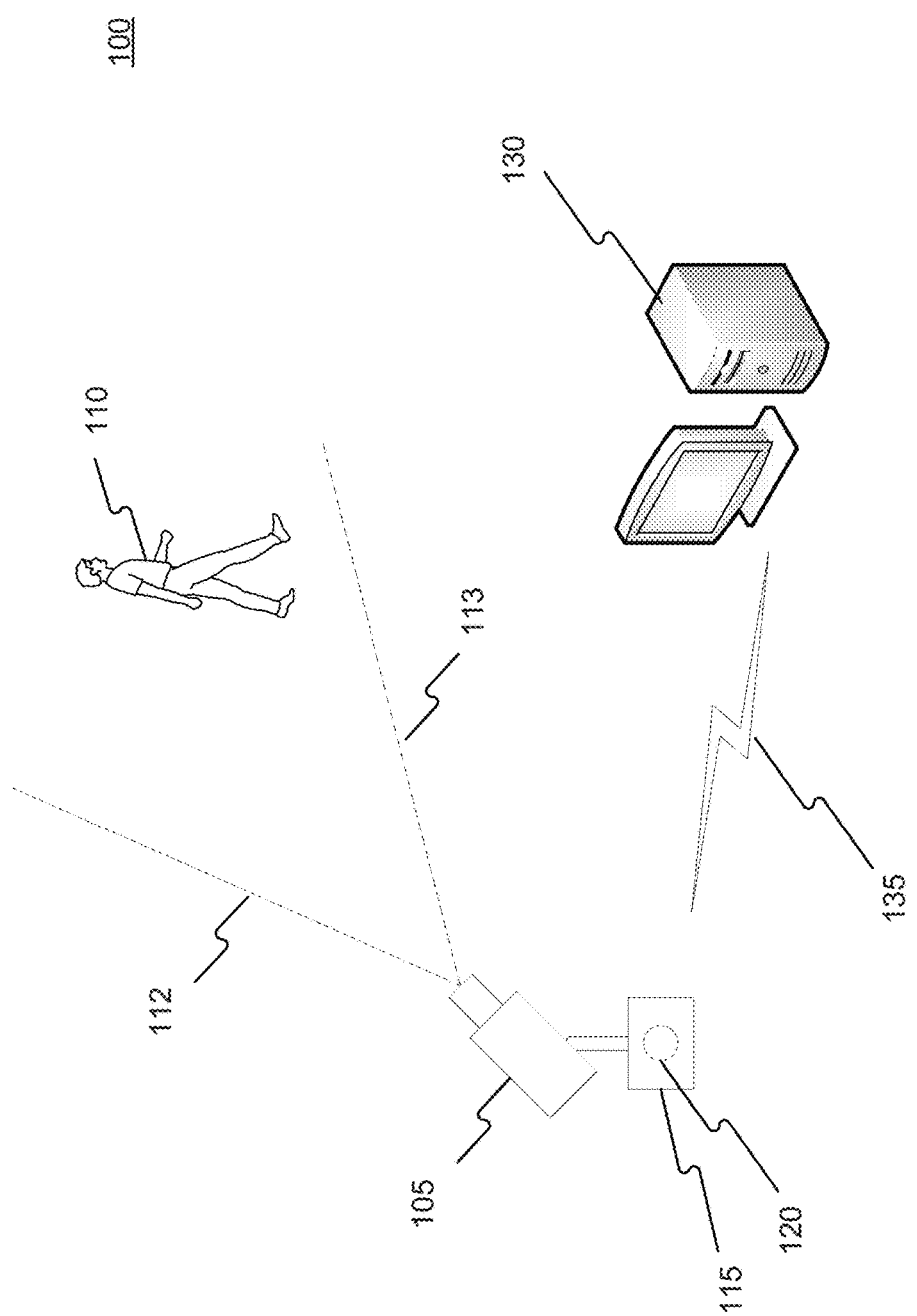
- FIG. 1 is a schematic diagram illustrating a system for detecting an object, according to an exemplary embodiment.

FIG. 1 is a schematic diagram illustrating a system 100 for detecting an object from image frames. As shown in FIG. 1, system 100 may include an image capturing device 105 configured to capture a plurality of image frames of an environment, which may include an object 110, such as a moving object. An image frame captured by image capturing device 105 may include one or more images. An object included in the image frame may be any object that may be stationary or moving, such as a human, a vehicle, an airplane, a flying ball, a ship, an animal, an insect, etc. For illustrative purpose only, object 110 is shown as a human in FIG. 1.

Image capturing device 105 may include a camera, such as a video camera, a digital photo camera, an infrared camera, etc. For simplicity of discussion, image capturing device 105 may be referred to as a camera 105. Camera 105 may have a field of view indicated by dashed lines 112 and 113. Camera 105 may be mounted on a camera mount 115, which may be further attached to another human (e.g., as a wearable device), a vehicle, an item of furniture, a post on a street, a wall of an office, a house, or a building, a roof, etc. Camera mount 115 may include a motor 120. Motor 120 may be configured to adjust an angle of camera 105, such as a panning angle, a tilt angle. In some embodiments, the angle of camera 105 may be adjusted in all directions. When motor 120 adjusts the angle of camera 105, the field of view of camera 105 is adjusted accordingly. Motor 120 may include any suitable motor, such as a stepper motor, a brushless motor, etc.

The disclosed system may include a computer 130. Computer 130 may include a monitor, a processor, a memory, a storage device, and other components. Computer 130 may communicate with camera 105 through a network 135, which may be a wired or wireless network. Network 135 may enable data transmission between camera 105 and computer 130 through a wired connection, such as a wire, a cable, etc., or a wireless connection, such as infrared, Wifi, Bluetooth, near field communication connection, cellular connection, radio connection, etc. Camera 105 may transmit captured image frames to computer 130. Computer 130 may send signals to camera 105 to control various settings of camera 105, such as zoom, pixel resolution, etc. Computer 130 may also send a control signal to motor 120 to adjust an angle of camera 105, thereby changing the field of view of camera 105. For example, when a moving object (e.g., human 110) is detected by computer 130 from the image frames captured by camera 105, computer 130 may send a control signal to motor 120 to adjust the angle of camera 105 such that the field of view follows the movement of moving object 110. Thus, system 100 may detect moving object 110 from a plurality of image frames, and may track moving object 110.

Although shown as separate components in FIG. 1, some or all of the functionality of computer 130 may be integrated with camera 105 as a single unit. For example, camera 105 may include a processor, a memory, a controller or control module as a single unit. In such embodiments, a separate computer 130 and/or network 135 may not be needed.

Figure 2:
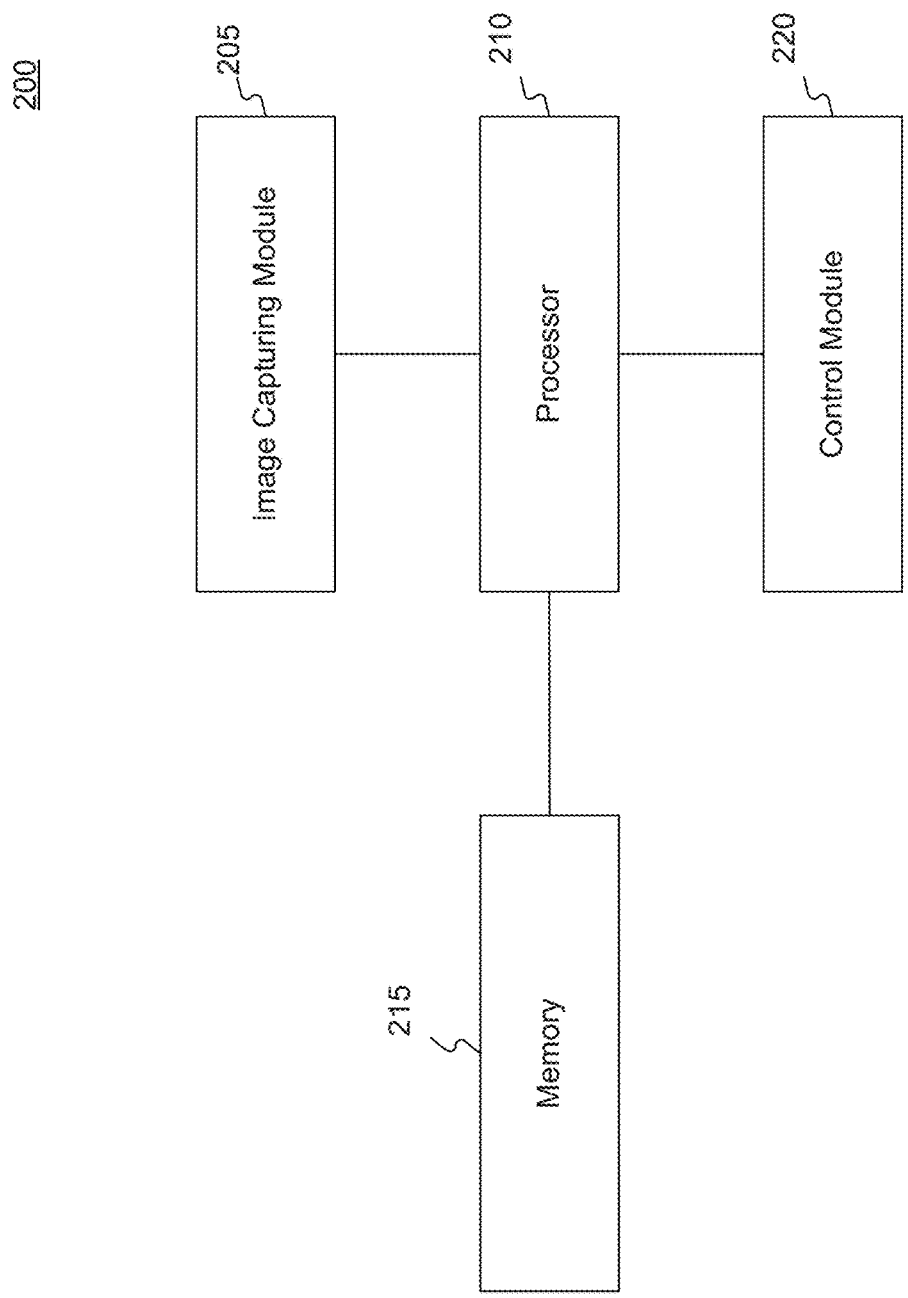
FIG. 2 is a block diagram of a system for detecting an object, according to an exemplary embodiment.

FIG. 2 is a block diagram of a system or device 200 for detecting and/or tracking an object in a plurality of image frames. System 200 may include an image capturing module 205, a processor 210, a memory 215, and a control module 220. Although only one image capturing module 205, one processor 210, one memory 215, and one control module 220 are shown in FIG. 2, system 200 may include more than one image capturing module 205, more than one processor 210, more than one memory 215, and more than one control module 220. In addition, system 200 may include additional components. For example, system 200 may include a storage device configured for storing data, such as image data received from camera 105. System 200 may include input/output devices, such as a keyboard, a mouse, a USB port, a monitor or screen, etc. In some embodiments, system 200 may include some or all of the components included in system 100, or vice versa. For example, system 200 may include camera 105, camera mount 115, motor 120, computer 130, and network 135 shown in FIG. 1. For example, camera 105 and camera mount 115 may be included in image capturing module 205. Motor 120 may be included in control module 220, and computer 130 may include processor 210. Network 135 may be included in system 200 for data communication between various components included in system 200.

The components included in system 200 may communicate with each other through any suitable communication means, such as a data and/or signal transmission bus, a cable, or other wired and/or wireless transmission means. For example, various components may communicate with each other through network 135 shown in FIG. 1. Although illustrative communication lines are shown in FIG. 2 between processor 210 and image capturing module 205, memory 215, and control module 220, each component shown in FIG. 2 may communicate (e.g., transmit data or signals) with another component directly or indirectly, through a suitable communication connection.

Image capturing module 205 shown in FIG. 2 may include hardware components, software components, or a combination of both. Image capturing module 205 may be configured to capture one or more image frames of an environment that includes an object, which may be a stationary object or a moving object. Although the disclosed systems and methods are illustrated in below embodiments as being configured for detecting a moving object, the disclosed systems and methods may also be used for detecting any object from an image frame, including a stationary object.

Image capturing module 205 may include hardware components, such as any suitable optical or non-optical image capturing devices or sensors. For example, image capturing module 205 may include one or more video cameras, digital cameras, film cameras, infrared cameras, etc. In one embodiment, image capturing module 205 includes camera 105 shown in FIG. 1. Image capturing module 205 may also include camera mount 115 and/or motor 120 shown in FIG. 1.

Image capturing module 205 may include software components, such as image processing code, for implementing methods related to image capturing and/or processing. In some embodiments, the image frames captured by image capturing module 205 may be directly transmitted to processor 210 for processing. In some embodiments, the image frames captured by image capturing module 205 may be stored in memory 215 (or other storage devices included in system 200), and retrieved or read by processor 210 for processing.

Processor 210 may be configured to (e.g. programmed to) process instructions to perform the disclosed methods for detecting and/or tracking an object, such as a moving object, from a plurality of image frames captured by image capturing module 205. For example, processor 210 may be configured to obtain image data of one or more image frames from image capturing module 205 or memory 215. Processor 210 may be configured to process the image data for detecting and/or tracking an object, such as a moving object from image frames.

Processor 210 may include hardware and/or software components. For example, processor 210 may include hardware components, such as at least one of a central processing unit (CPU), a graphical processing unit (GPU), a microprocessor, a digital signal processor, circuits, etc. In some embodiments, processor 210 may include any appropriate type of general-purpose processors, microprocessors, and controllers. In some embodiments, processor 210 may also include special-purpose microprocessors, digital signal processors (DSPs), application specific integrated circuits (ASICs), digital signal processors (DSPs), digital signal processing devices (DSPDs), programmable logic devices (PLDs), or field programmable gate arrays (FPGAs).

Processor 210 may also include executable software code that is embedded within the circuits of processor 210 or stored within memory 215 for performing computational functions and/or image processing functions provided by processor 210. In some embodiments, processor 210 may be implemented as software for performing the disclosed methods for detecting and/or tracking an object, such as a moving object. In one embodiment, processor 210 may be included in computer 130 shown in FIG. 1. Computer 130 may be included in system 200 shown in FIG. 2.

Memory 215 may include any suitable non-transitory computer-readable medium. Memory 215 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In addition to executable code, memory 215 may be configured to store data, such as image data of a plurality of image frames captured by image capturing module 205. In some embodiments, processor 210 may read or retrieve image data from memory 215 for processing.

Memory 215 may include various databases and image processing software. For example, memory 215 may store instructions that are executable by processor 210. When executed by processor 210, the instructions may cause processor 210 (and/or system 200) to perform the disclosed methods for detecting and/or tracking an object from the image frames, such as detecting and tracking a moving object.

Control module 220 may include hardware and/or software components configured to perform various control functions. For example, control module 220 may include one or more circuits configured to drive a motor (e.g., motor 120) installed at a camera mount (e.g., camera mount 115), on which a camera (e.g., camera 105) is mounted. Motor 120 may be configured to change a mounting angle of camera 105 or an angle that camera 105 is pointing, thereby changing a field of view of camera 105. For example, when a moving object is detected by processor 210 from a plurality of image frames captured by image capturing module 205 (which may include camera 105), processor 210 may send a control signal, e.g., through control module 220, to motor 120. The control signal may drive motor 120 to adjust an angle (e.g., a panning angle and/or a tilt angle) of camera 105, thereby changing the field of view of camera 105 for, e.g., tracking a moving object identified in the image frames.

Figure 3A:
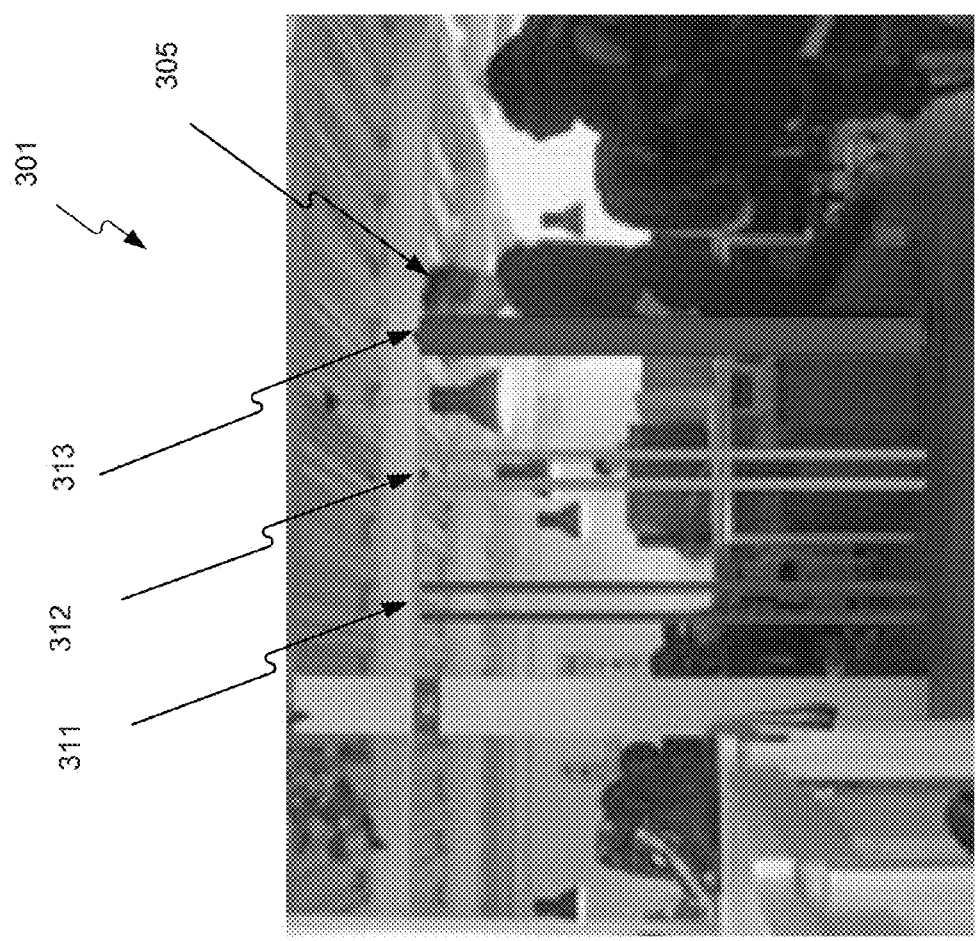
FIG. 3A is an image frame showing a method of detecting an object, according to an exemplary embodiment.

FIG. 3A shows an example image frame for illustrating the disclosed methods for detecting and/or tracking an object, such as a moving object. As shown in FIG. 3A, an image frame 301 is captured by image capturing module 205. Image capturing module 205 may include a camera (e.g., camera 105) with a field of view represented by the borders of image frame 301. Processor 210 may obtain image data of image frame 301 from image capturing module 205 or from memory 215 that stores image data of the image frames captured by image capturing module 205.

In FIG. 3A, image frame 301 includes an image of an office environment captured by a camera. People may walk around the office space. A human may enter the field of view of the camera and be detected as a moving object. In the example shown in FIG. 3A, an object 305, which is a human, is walking in the office space within a field of view of the camera.

One or more regions of interest (ROIs) may be arranged in each image frame. The ROIs shown in FIG. 3A include a left ROI 311, a center ROI 312, and a right ROI 313. Although three ROIs are shown to be arranged in image frame 301, the disclosed systems and methods may use only one ROI, two ROIs, or more than three ROIs, such as four ROIs, five ROIs. When one ROI is used, the system may detect a moving object entering or exiting the ROI. The one-ROI system, however, may not detect a moving direction of the ROI. When two ROIs are used, the system may detect the moving direction and speed of the moving object. The two-ROI system, however, may be sensitive to environmental changes. When three ROIs are used, as shown in FIG. 3A, the system may achieve robust, fast, and accurate detection of a moving object.

The three ROIs may be arranged at a center portion of the field of view (e.g., at the center portion of image frame 301). For example, the three ROIs may be arranged as a group around the center ⅓ portion of image frame 301. Although one group of three ROIs are shown as arranged at the center portion of image frame 301, the disclosed systems and methods may use multiple groups of ROIs in image frame 301 for detecting multiple moving object simultaneously. For example, image frame 301 may include two or more groups of ROIs arranged at suitable locations within image frame 301 for detecting and/or tracking two or more moving objects at two or more regions of image frame 301. The number of ROIs included in different groups of ROIs may be the same or may be different.

In the embodiment shown in FIG. 3A, each of ROIs 311, 312, and 313 may include a narrow, vertically extended rectangular area defined by two vertical parallel lines, as shown in FIG. 3A. In other embodiments, the ROIs may be defined by lines forming other shapes, such as a circle, an oval, a triangle, etc. In addition, the ROIs may be defined to have different shapes. As shown in FIG. 3A, the vertical lines that define different ROIs may be shown in different colors. In some embodiments, they may be shown in the same color. In some embodiments, the lines that define the ROIs may not be displayed along with the image frames. They may be shown in FIGS. 3A-3C only for illustrating the disclosed methods. In some embodiments, other forms of indicators (other than lines shown in FIGS. 3A-3C) may be displayed along with the image frames to indicate the ROIs. In the embodiment shown in FIG. 3A, ROIs 311, 312, and 313 are separated from each other, and arranged at the same height within the field of view. In some embodiments, the ROIs may be uniformly distributed within the center ⅓ area of image frame 301. In some embodiments, the distance between left ROI 311 and center ROI 312 may be different from the distance between center ROI 312 and right ROI 313. The dimensions and shapes of the ROIs included in an image frame may be different or the same, and may be fixed or dynamically adjustable.

In the embodiment shown in FIG. 3A, the ROIs may be displayed as lines superimposed on the image data displayed on a display (e.g., a screen, a computer monitor, etc.). For example, the disclosed system may display the vertically extended lines that define the ROIs as superimposed on the image included in image frame 301, as shown in FIG. 3A. In some embodiments, the lines that define the ROIs may not be displayed along with the actual image data of image frame 301. The lines defining the ROIs may be used in the methods for detecting and/or tracking the object, but may not be displayed to a user of the disclosed system. In the embodiment shown in FIG. 3A, when the system detects human 305 entering right ROI 313, the system may display a highlighted right ROI 313 on a display that displays the image frame 301, as shown in FIG. 3A. For example, the rectangular area of right ROI 313 may be filled with a color to indicate to a user that a moving object entered right ROI 313. Other suitable highlight means may also be used to highlight right ROI 313. In some embodiments, a ROI is visibly displayed only when a moving object enters the ROI.

Processor 210 may obtain image data of right ROI 313 from image frame 301 after detecting moving object 305 entering right ROI 313. Processor 210 may compare the image data (e.g., brightness data) of right ROI 313 with image data (e.g., brightness data) of a background image corresponding to right ROI 313 using the methods described below. Processor 210 may also obtain color data as part of the image data of right ROI 313. The color data of right ROI 313 may be used to compare to color data of center ROI 312, which may be obtained in an image frame 302 shown in FIG. 3B, and/or color data of left ROI 311, which may be obtained in an image frame 303 shown in FIG. 3C.

Figure 3B:
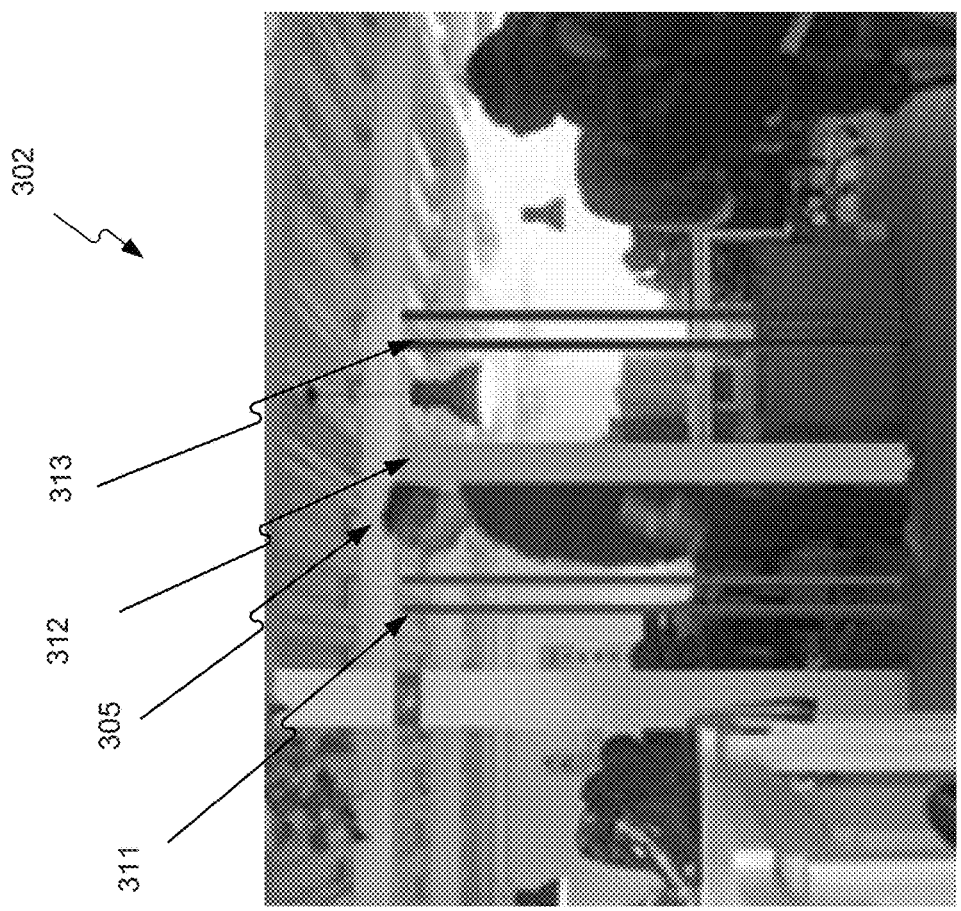
FIG. 3B is another image frame showing the method of detecting an object, according to an exemplary embodiment.

FIG. 3B shows an image frame 302 for illustrating the disclosed methods for detecting and/or tracking an object, such as a moving object. Image frame 302 may be captured by image capturing module 205 after image frame 301 (FIG. 3A) is captured. For example, image frame 301 may be captured at time $t_1$, and image frame 302 may be captured at time $t_2$, later than $t_1$. As shown in FIG. 3B, human 305 has moved from right ROI 313 to center ROI 312. In some embodiments, when the system detects human 305 enters center ROI 312, center ROI 312 may be displayed as highlighted on the display that displays image frame 302, as shown in FIG. 3B. In the embodiment shown in FIG. 3B, center ROI 312 is filled with a color that is different from the color used for highlight right ROI 313. In some embodiments, the same color may be used to fill right ROI 313 and center ROI 312 to highlight them. Other highlight means may also be used.

Processor 210 may obtain image data of center ROI 312 from image frame 302 after detecting moving object 305 entering center ROI 312. Processor 210 may compare the image data (e.g., brightness data) of center ROI 312 with image data (e.g., brightness data) of a background image corresponding to center ROI 312 using the methods described below. Processor 210 may also obtain color data as part of the image data of center ROI 312. The color data of center ROI 312 may be used to compare to color data of right ROI 313, which may be obtained in image frame 301 shown in FIG. 3A, and/or color data of left ROI 311, which may be obtained in image frame 303 shown in FIG. 3C.

Figure 3C:
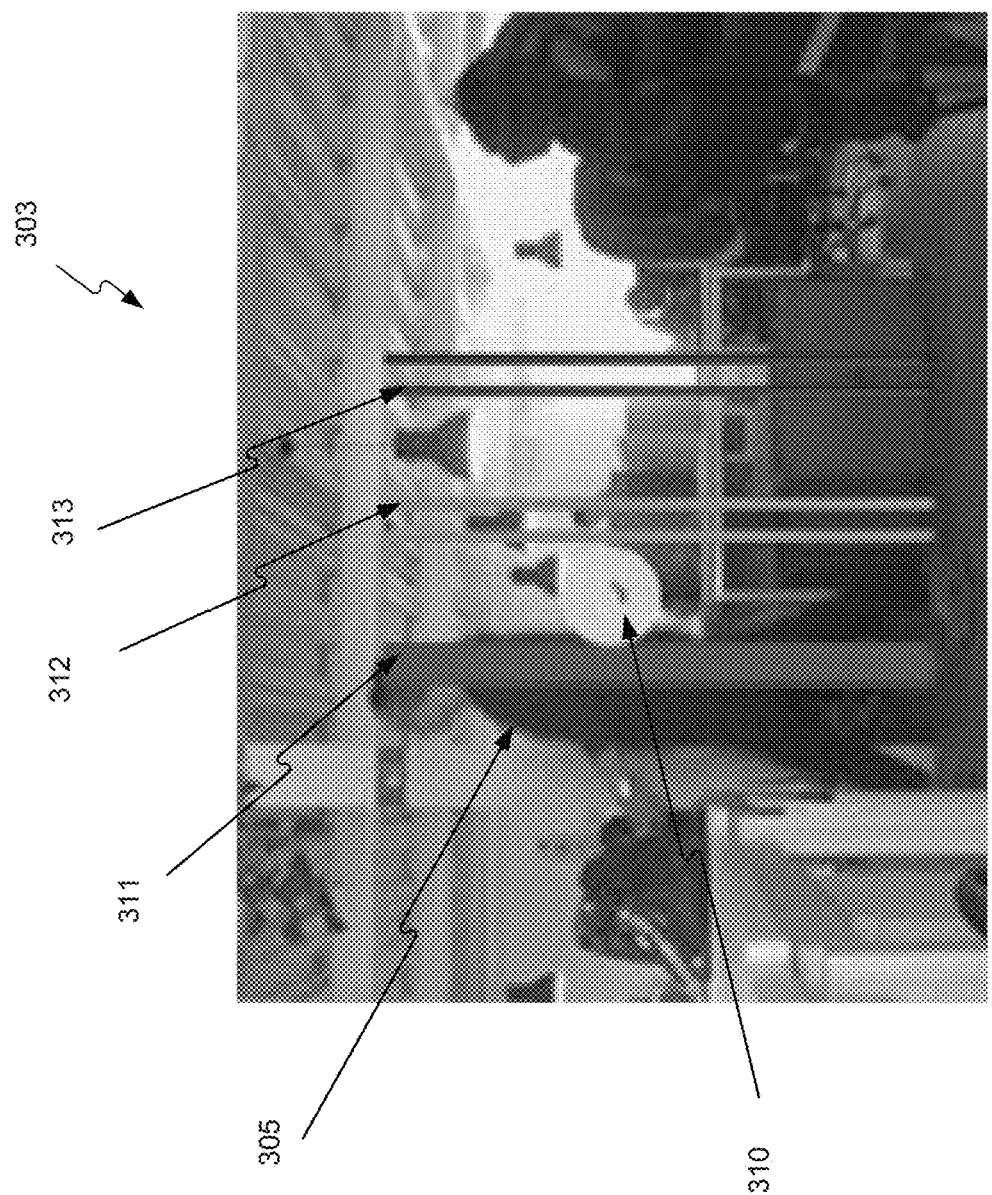
FIG. 3C is another image frame showing the method of detecting an object, according to an exemplary embodiment.

FIG. 3C shows an image frame 303 for illustrating the disclosed methods for detecting and/or tracking an object, such as a moving object. Image frame 303 may be captured by image capturing module 205 after image frame 302 (FIG. 2B) is captured. For example, image frame 303 may be captured at time $t_3$, with $t_3$ later than $t_2$, and $t_2$ later than $t_1$. As shown in FIG. 3C, human 305 has moved from center ROI 312 to left ROI 311. In some embodiments, when the system detects human 305 enters left ROI 311, left ROI 311 may be displayed as highlighted on the display that displays image frame 302, as shown in FIG. 3C. In the embodiment shown in FIG. 3C, left ROI 311 is filled with a color, which is different from the color used for highlighting center ROI 312 and right ROI 313. The same color may be used for filing left ROI 311, center ROI 312, and right ROI 313 for highlighting them. Other highlighting means may also be used.

Processor 210 may obtain image data of left ROI 311 from image frame 303 after detecting moving object 305 entering left ROI 311. Processor 210 may compare the image data (e.g., brightness data) of left ROI 311 with image data (e.g., brightness data) of a background image corresponding to left ROI 311 using the methods described below. Processor 210 may also obtain color data as part of the image data of left ROI 311. The color data of left ROI 311 may be used to compare to color data of center ROI 312, which may be obtained in an image frame 302 shown in FIG. 3B, and/or color data of right ROI 313, which may be obtained in image frame 301 shown in FIG. 3A.

As shown in FIG. 3C, when processor 210 identifies moving object 305 and determines to track moving object 305, a tracking indicator 310 may be superimposed in the image frame displayed on a display (e.g., a screen, a monitor, etc.). Tracking indicator 310 may follow moving object 305 as the moving object 305 continues to move to the left. Although a circle is used as an example of tracking indicator 310, tracking indicator 310 may be in other forms or shapes, such as a rectangle surrounding moving object 305. In some embodiments, the tracking indicator 310 may not be displayed. When processor 210 identifies moving object 305 and determines to track moving object 305, processor 210 may send a control signal to motor 120 (FIG. 1) to start driving motor 120 to adjust an angle of camera 105, such that the field of view of camera 105 follows the movement of moving object 305. In other words, during tracking, motor 120 may adjust the angle of camera 105 such that moving object 305 is kept within the field of view.

Figure 4:
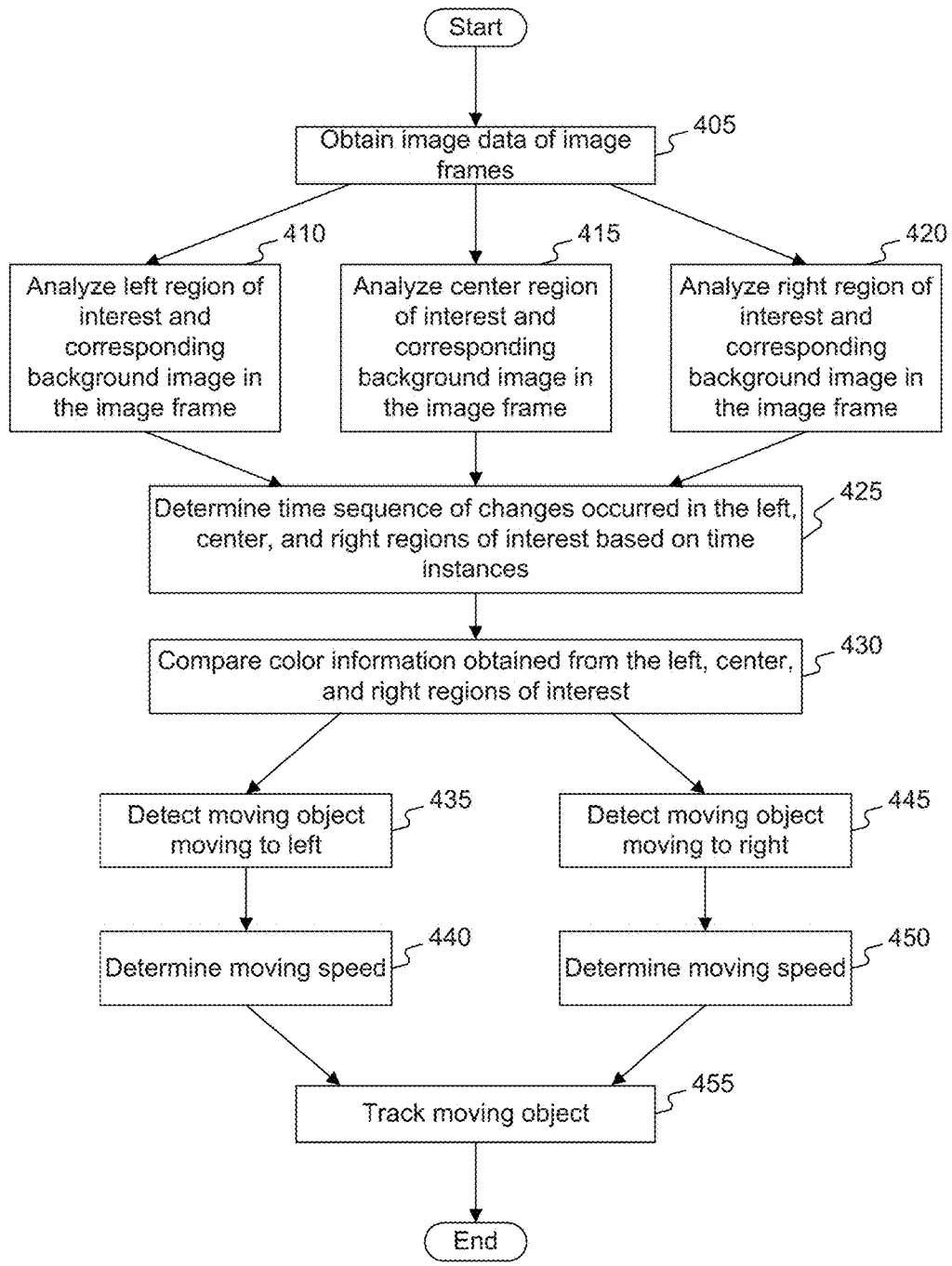
FIG. 4 is a flowchart showing a method for detecting an object, according to an exemplary embodiment.

FIG. 4 is a flowchart illustrating a method 400 for detecting and/or tracking an object from a plurality of image frames. Method 400 may be performed by the system 200, such as processor 210. The object may be a moving object, such as a vehicle, a human, etc. Method 400 may include obtaining image data of a plurality of image frames (step 405). For example, when a video camera is used as camera 105 (or included in image capturing module 205), obtaining image data of a plurality of image frames may include receiving a video signal input from the video camera, or retrieving the video data from memory 215 that stores the video data. The video data may include image data of a plurality of image frames.

For each image frame, processor 210 may perform one or more of steps 410, 415, and 420. In steps 410, 415, and 420, processor 210 may carry out similar analysis and process for different region of interest (ROI). The analysis of an ROI and its corresponding background image (also referred to as "background") may be performed independently from any other ROIs. For example, in step 410, processor 210 may analyze image data of the left ROI (e.g., left ROI 311) and corresponding background image in an image frame (e.g., image frame 301). In step 415, processor 210 may analyze image data of the center ROI (e.g., center ROI 312) and corresponding background image in an image frame (e.g., image frame 302). In step 420, processor 210 may analyze image data of the right ROI (e.g., right ROI 313) and corresponding background image in an image frame (e.g., image frame 303). In some embodiments, for each image frame, only one of steps 410, 415, and 420 is carried out by processor 210. In other embodiments, for each image frame, two or more steps 410, 415, and 420 may be carried out by processor 210. In steps 410, 415, and 420, analyzing an ROI and corresponding background image may include comparing the image data of the ROI with image data of the background, updating the image data of the background when certain criteria are satisfied based on a result of the comparison, and obtaining time and/or color data for detecting an object, such as a moving object, from the image frames. When more than three ROIs are included in an image frame, method 400 may include additional steps similar to those of steps 410, 415, and 420. When fewer than three ROIs are included in an image frame, one or more of steps 410, 415, and 420 may not be included in method 400. For example, when only two ROIs (right and center ROIs 313 and 312) are included in the image frames, step 410 may be omitted.

Updating the image data of a background corresponding to an ROI in a present image frame may be performed for each ROI independently. First, initial image data for the background of an ROI is obtained after a certain number (e.g., N, which may be a positive integer, e.g., 2, 3, 5, 10, 15, 20, etc.) of image frames have been obtained. As image frames are obtained subsequently, the background may be updated using the newly obtained image data of the ROI. The initial image data of the background may be obtained using the following method.

For each ROI, the initial image data of the background may be determined based on image data of the ROI from a predetermined number of image frames, such as the last N image frames as described below. The last N image frames refers to the previously obtained image frames counted backwards from a present image frame under analysis. The term "last N image frames" may include the present image frame including the ROI that is being analyzed. The last N image frames may be the last N consecutively or non-consecutively obtained image frames. In other embodiments, the term "last N image frames" may not include the present image frame including the ROI that is being analyzed.

The image data of an image (e.g., of ROI or background) may include pixel values of pixels included in the image. A pixel value may include both the brightness data and the color data of a pixel. First, for any image frame, the brightness of the pixels included in an ROI may be obtained as an n-by-m brightness matrix $M_{n,m}$, where n is a positive integer standing for the number of rows and m is a positive integer standing for the number of columns. The brightness matrix $M_{n,m}$ may be converted or transformed into an n-by-1 brightness vector P by calculating a value based on all m columns in each row. For example, processor 210 may add up values in all m columns in each row, and use that sum as a value for the row in vector P. In other words, each row in the brightness vector P may be obtained by P(i)=sum (M(i,1), M(i,2), . . . , M(i,m)), where sum ( ) stands for a mathematical function of summation, and where i=1, 2, . . . , n, standing for the row number of the vector P.

This conversion or transformation is performed for the last N image frames to generate N brightness vectors representing image data of the last N image frames, $P_{f1}$, $P_{f2}$, . . . , $P_{fN}$. The initial brightness vector Q for the background image corresponding to the ROI may be obtained based on a statistical analysis on $P_{f1}$, $P_{f2}$, . . . , $P_{fN}$ corresponding to the last N consecutive image frames. The statistical analysis may include any suitable statistical analysis. In one embodiment, the statistical analysis may include calculating a median vector based on $P_{f1}$, $P_{f2}$, . . . , $P_{fN}$. For example, each row of the initial vector Q may be calculated as Q(i)=median ($P_{f1}$(i), $P_{f2}$(i), . . . , $P_{fN}$(i)), where median ( )stands for a mathematical function of median calculation, i=1, 2, . . . , n, standing for the row number of vector Q. In other words, each row of the initial vector Q for the background image may be the median value of the corresponding rows of the brightness vectors of the last N image frames. In another embodiment, the statistical analysis may include calculating an average vector based on $P_{f1}$, $P_{f2}, \ldots, P_{fN}$. For example, each row of the initial vector Q may be calculated as Q(i)=mean ($P_{f1}$(i), $P_{f2}$(i), ..., $P_{fN}$(i)), where mean ( ) stands for a mathematical function of mean or average calculation. In other words, each row of the initial vector Q for the background image may be the average value of the corresponding rows of the brightness vectors of the last N image frames.

Other statistical values calculated based on $P_{f1}, P_{f2}, \ldots, P_{fN}$ corresponding to the last N image frames may also be used in the initial vector Q for the background image.

After the initial vector Q is obtained for a background image of an ROI, the initial vector Q may be updated as more image frames are captured by camera 105. Some existing technologies update the background image (e.g., update Q) in real time, meaning that Q is updated with every newly captured image frame. Such methods tend to blend image data of the moving object appearing at the foreground into the background image, which affects the extraction of background image. Other existing technologies do not update the background image at all, which are ineffective for changing scenes.

Figure 5:
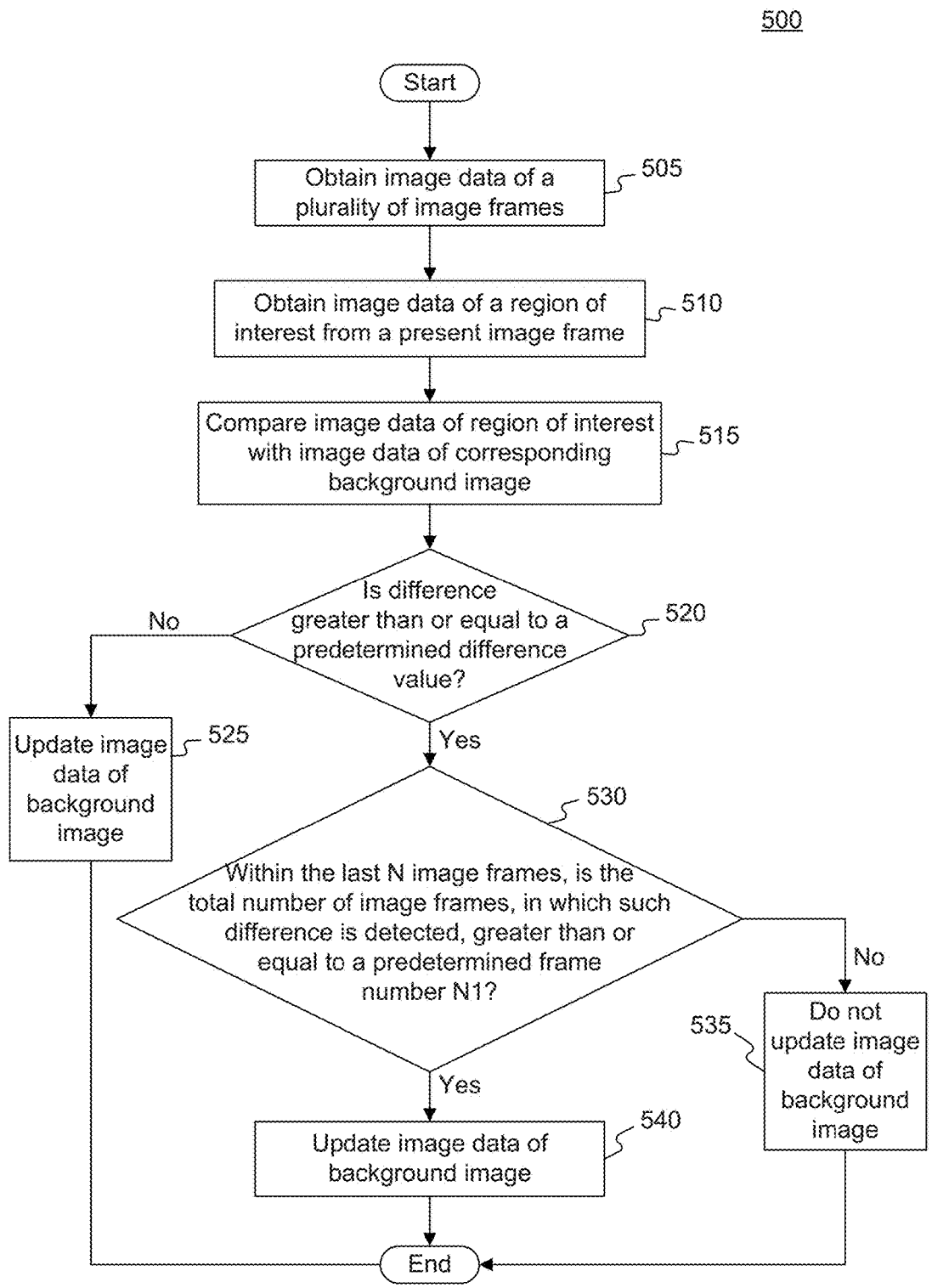
FIG. 5 is a flowchart showing a method for updating image data of a background, according to an exemplary embodiment.

The present disclosure provides a new method for updating the background image that addresses problems associated with the existing technologies. FIG. 5 is a flowchart illustrating a method 500 for updating data of a background image corresponding to an ROI. In other words, for each ROI, method 500 may be performed to determine whether the background image should be updated. Method 500 may include obtaining image data of a plurality of image frames (step 505). For example, processor 210 may obtain the image data of a plurality of image frames from camera 105 (or image capturing module 205), or from memory 215. Method 500 may also include obtaining image data for an ROI (e.g., one of ROIs 311, 312, and 313) from a present image frame (e.g., one of image frames 301, 302, and 303) (step 510). For each ROI, processor 210 may compare image data of the ROI (e.g., ROI 311) with data of a corresponding background image (step 515).

Processor 210 may determine whether a difference between the image data of the ROI and the image data of the background is greater than or equal to a predetermined difference value (step 520). When the difference is not greater than or equal to (i.e., smaller than) the predetermined difference value (No, step 520), processor 210 may update the image data of the background using the image data of the ROI obtained from the present image frame (step 525). When the difference is greater than or equal to the predetermined difference value (Yes, step 520), processor 210 may determine whether within the last N image frames, a total number of image frames $N_f$ in which such difference is detected, is greater than or equal to a predetermined frame number $N_1$ (i.e., $N_f \geq N_1$) (step 530). When the total number of image frames $N_f$ is not greater than or equal to N1 (i.e., $N_f < N_i$) (No, step 530), processor 210 may not update the image data of the background (step 535). When the total number of image frames $N_f$ is greater than or equal to $N_1$ (i.e., $N_f \geq N_1$) (Yes, step 530), processor 210 may update the image data of the background (step 540). In some embodiments, processor 210 may update the image data of the background using image data of the ROI from the last N image frames. The updated image data of the background may be stored in memory 215 or other storage devices.

In some embodiments, step 515 may be implemented as follows. Take left ROI 311 (FIGS. 3A-3C) as an example, the initial vector of the background image may be represented by Q=$[q_1, q_2, \ldots, q_N]^T$, and a brightness vector P=$[p_1, p_2, \ldots, p_N]^T$ representing the image data of the left ROI 311 in the present image frame may be obtained by calculating a brightness value based on brightness values (e.g., adding up brightness values) in all columns in each row of a brightness matrix containing brightness values of the pixels included in left ROI 311, as described above. The symbol $[\ ]^T$ means a mathematical operation of transposition of a vector. Therefore, P and Q are N-by-1 vectors. The brightness vectors P and Q may be subtracted from each other to obtain a brightness difference vector D=$[d1, d2, \ldots dn]^T$. Each row of D represents the difference between corresponding rows of P and Q. In some embodiments, D may represent the absolute difference between P and Q, i.e., D(i)=P(i)−Q(i), where i=1, 2, ..., n. That is, each row of D may represent the absolute change in brightness values. In some embodiments, D may represent a relative difference (in percentage) between P and Q, e.g., D(i) =100%*(P(i)−Q(i))/Q(i). That is, each row of D may represent a relative change in brightness values. In some embodiments, two difference vectors $D_1$ and $D_2$ are calculated, with $D_1$ including the absolute changes in brightness values, and $D_2$ including the relative changes in brightness values.

In some embodiments, step 520 may be implemented as follows. Each row of $D_1$, i.e., $D_1$(i), may be compared with a predetermined absolute change $D_{abs}$, e.g., 5, 10, 15, 20, etc. Processor 210 may determines whether $D_1$(i) is greater than or equal to $D_{abs}$. Additionally or alternatively, each row of $D_2$, i.e., $D_2$(i), may be compared with a predetermined relative change $D_{perc}$, e.g., 15%, 20%, 30%, etc. Processor 210 may determine whether $D_2$(i) is greater than or equal to $D_{perc}$.

Various methods may be used to determine whether the difference between the image data of the ROI and the image data of the background is greater than or equal to a predetermined difference value in step 520. For example, in some embodiments, processor 210 may determine that the difference between the image data of the ROI and the image data of the background is greater than or equal to a predetermined difference value (Yes, step 520) when processor 210 determines that a total number of rows in $D_1$ that are greater than or equal to $D_{abs}$ is greater than or equal to a predetermined row number $R_1$ (e.g., 5, 8, 10, etc.) and a total number of rows in $D_2$ that are greater than $D_{perc}$ is greater than or equal to a predetermined row number $R_2$ (e.g., 5, 8, 10, etc.). Otherwise, if the total number of rows in $D_1$ that are greater than or equal to $D_{abs}$ is less than $R_1$, and/or the total number of rows in $D_2$ that are greater than $D_{perc}$ is less than $R_2$, processor 210 may determine that the difference between the image data of the ROI and the image data of the background is less than a predetermined difference value (No, step 520). For example, even if the total number of rows in $D_2$ that are greater than $D_{perc}$ is greater than or equal to $R_2$, processor 210 may determine that the difference is smaller than the predetermined difference value when the total number of rows in $D_1$ that are greater than or equal to $D_{abs}$ is less than $R_1$, which indicates that the absolute changes are small, and vice versa. In these embodiments, the "difference between the image data of the ROI and the image data of the background" includes both the absolute difference and the relative difference, and the "predetermined difference value" includes both the predetermined absolute change $D_{abs}$ and the predetermined relative change $D_{perc}$.

In other embodiments, method 500 may use only one of the absolute difference vector $D_1$ and the relative difference vector $D_2$ in the determination performed in step 520. For example, processor 210 may implement step 520 by determining that the total number of rows in $D_1$ that are greater than or equal to $D_{abs}$ is greater than or equal to $R_1$ (Yes, step 520), or is less than $R_1$ (No, step 520). In this example, the difference is represented by the absolute change in brightness values, and the predetermined difference value is $D_{abs}$. As another example, processor 210 may implement step 520 by determining that the total number of rows in $D_2$ that are greater than $D_{perc}$ is greater than or equal to $R_2$ (Yes, step 520), or is less than $R_2$ (No, step 520). In this example, the difference is represented by the relative change in brightness values, and the predetermined difference value is $D_{perc}$.

If processor 210 determines "No" in step 520 (e.g., by determining at least one of the following is not satisfied: "a total number of rows in $D_1$ that are greater than or equal to $D_{abs}$ is greater than or equal to $R_1$," "a total number of rows in $D_2$ that are greater than $D_{perc}$ is greater than or equal to $R_2$," or both), processor 210 may update the image data of the background (step 525). This means, when the difference between the image data of the ROI and the background is small, the background image is updated using the image data of the ROI in the present image frame. The updating may be the same as the background image updating method discussed above, i.e., using the median or average value of the ROI image data from the last N image frames including the present image frame. For example, the brightness vector Q of the background image may be replaced with a median or average vector obtained based on brightness vectors $P_{f1}$, $P_{f2}$, . . . , $P_{fN}$ corresponding to the last N image frames.

If processor 210 determines "Yes" in step 520 (e.g., by determining at least one of the following is satisfied: "a total number of rows in $D_1$ that are greater than or equal to $D_{abs}$ is greater than or equal to $R_1$," "a total number of rows in $D_2$ that are greater than $D_{perc}$ is greater than or equal to $R_2$," or both), processor 210 may check the results of similar determinations made in step 520 for the last N image frames (which may or may not include the present image frame). Processor 210 may calculate the total number of image frames $N_f$ in the last N image frames, in which a "Yes" determination is made in a similar step 520 performed previously. In other words, in those $N_f$ image frames, at least one of the following is satisfied: "a total number of rows in $D_1$ that are greater than or equal to $D_{abs}$ is greater than or equal to $R_1$," "a total number of rows in $D_2$ that are greater than $D_{perc}$ is greater than or equal to $R_2$," or both.

In step 530, processor 210 may also determine whether $N_f$ is greater than or equal to the predetermined frame number $N_1$. If $N_f \geq N_1$, processor 210 may update the image data of the background (e.g., brightness vector Q) using the image data of the ROI (e.g., brightness vector P) (step 540). Otherwise, processor 210 may not update the image data of the background (step 535). The background image updating in step 540 may be similar to those discussed above in step 525. That is, the background image updating may be based on the last N image frames, including the present image frame.

Referring back to FIG. 4, in each of steps 410, 415, and 420, processor 210 may further determine the time instances at which a change first occurred to an ROI. For example, when a moving object enters an ROI defined by two vertical lines as shown in FIG. 3A, the moving object may cause a change to the image data of the ROI as compared to its corresponding background image. For example, referring to FIG. 3A, when human 305 first enters right ROI 313 (e.g., crosses the right vertical line of right ROI 313), processor 210 may record a time instance $T_1$ in memory 215. Referring to FIG. 3B, when human 305 first enters center ROI 312 (e.g., crosses the right vertical line of center ROI 312), processor 210 may record a time instance $T_2$ in memory 215. Referring to FIG. 3C, when human 305 first enters left ROI 311 (e.g., crosses the right vertical line of left ROI 311), processor 210 may record a time instance $T_3$ in memory 215.

In step 425, processor 210 may determine a time sequence of changes occurred to right, center, and left ROIs 313, 312, and 311, based on the recorded time instances $T_1$, $T_2$, and $T_3$. For example, when $T_1$ is earlier than $T_2$, and $T_2$ is earlier than $T_3$, processor 210 may determine the time sequence of changes as the following: the changes occurred to right ROI 313 first, then to center ROI 312, and finally to left ROI 311. Alternatively, if $T_3$ is earlier than $T_2$, and $T_2$ is earlier than $T_1$, then processor 210 may determine the time sequence of changes as follows: the changes occurred to left ROI 311 first, and then to center ROI 312, and finally to right ROI 313.

Referring to FIG. 4, processor 210 may compare color data obtained from left, center, and right ROIs 311, 312, and 313 (step 430). Processor 210 may obtain color data for the ROIs from different image frames. For example, processor 210 may obtain color data for right ROI 313 from image frame 301, obtain color data for center ROI 312 from image frame 302, and obtain color data for left ROI 311 from image frame 301. For the pixels included in each ROI, the image data may include both the brightness data and the color data. Similar to the brightness data, the color data may be included in one or more color matrices. For example, the one or more color matrices may include a color matrix for Red color, a color matrix for Green color, and a color matrix for Blue color. In some embodiments, the color data of the ROI may be included in a matrix including Hue data for the pixels. For simplicity of discussion, the color data is assumed to be stored in a color matrix, with each data point representing the color data for each pixel of the ROI. Using processes similar to those discussed above in connection with obtaining a brightness vector, a color vector $V_c$ may be obtained from a color matrix by adding up all columns in each row of the matrix as a row of $V_c$.

Processor 210 may select certain rows of color vector $V_c$, and generate another color vector $V_{c2}$ containing the selected rows. The selected rows include color data of areas (e.g., arears around a certain height) of the ROI to which changes occurred. Processor 210 may determine which rows to select from $V_c$ based on the rows in the brightness vector P of the ROI, in which difference (as compared to the brightness vector Q of the background image) greater than or equal to the predetermined difference value is detected in step 520. For example, when P is compared to Q, one or both of the following conditions may be satisfied: a total number of rows in $D_1$ that are greater than or equal to $D_{abs}$ is greater than or equal to $R_1$ and a total number of rows in $D_2$ that are greater than $D_{perc}$ is greater than or equal to $R_2$. Depending on applications, if one or both of the above conditions are satisfied, processor 210 determines that there exists a moving object in the ROI. Those rows satisfying one or both of these conditions in $D_1$ and/or $D_2$ are identified, and their positions in the vectors are recorded (e.g., saved in a variable named "position_Move."). Those rows in brightness vector P at these positions are identified (e.g., row number 1, 5, 8, 10). Then, the corresponding rows at these positions in the color vector $V_c$ are identified, and selected to form the color vector $V_{c2}$. $V_{c2}$ includes color data of areas of the ROI to which changes occurred. For example, each row of $V_{c2}$ indicates the color of an area of the ROI at a height that corresponds to the position of the row.

Processor 210 may obtain a color vector $V_{c2}$ for each ROI. For example, left ROI 311 may be associated with a color vector $V_{c2\_L}$, center ROI 312 may be associated with a color vector $V_{c2\_C}$, and right ROI 313 may be associated with a color vector $V_{c2\_R}$.

In step 430, processor 210 may determine whether a same moving object has moved across the right, center, and left ROIs 313, 312, and 311 based on a determination of whether the difference between the color vectors, $V_{c2\_L}$, $V_{c2\_C}$, and $V_{c2\_R}$ is small (e.g., smaller than a predetermined color difference value), or substantially the same. Various methods may be used to quantify the color difference and determine whether the color difference between the color vectors is sufficiently small such that processor 210 may determine that a same moving object has moved across the ROIs. In one embodiment, processor 210 may compare the color vectors to obtain color difference vectors, e.g., ($V_{c2\_L}$–$V_{c2\_C}$), and ($V_{c2\_C}$–$V_{cs\_R}$). Processor 210 may determine whether the value of each row of the resulting color difference vectors falls within a predetermined range of color difference values, or is smaller than a predetermined color value. For example, if each row of the color difference vectors falls within the predetermined range of color difference values or is smaller than the predetermined color difference value, the color difference in the ROIs may be determined to be sufficiently small to indicate that a same object moved across the ROIs. Otherwise, the color difference in the three ROIs may be determined to be large, and processor 210 may determine that the changes caused by a moving object in the ROIs are not caused by the same object. In one embodiment, when the color difference is large (indicating that different moving objects may have caused the changes in the ROIs), processor 210 may not perform steps 435-455. When the color difference between the ROIs is sufficiently small, as discussed above, processor 210 may continue to perform steps 435-455.

In step 435, processor 210 may detect, in the image frames, a moving object (e.g., same moving object 305) moving from right to the left in the field of view. In step 445, processor 210 may detect, in the image frames, a moving object moving from left to the right in the field of view. In some embodiments, processor 210 may perform one of steps 435 and 445. In some embodiments, processor 210 may perform both steps 435 and 445.

Figure 6:
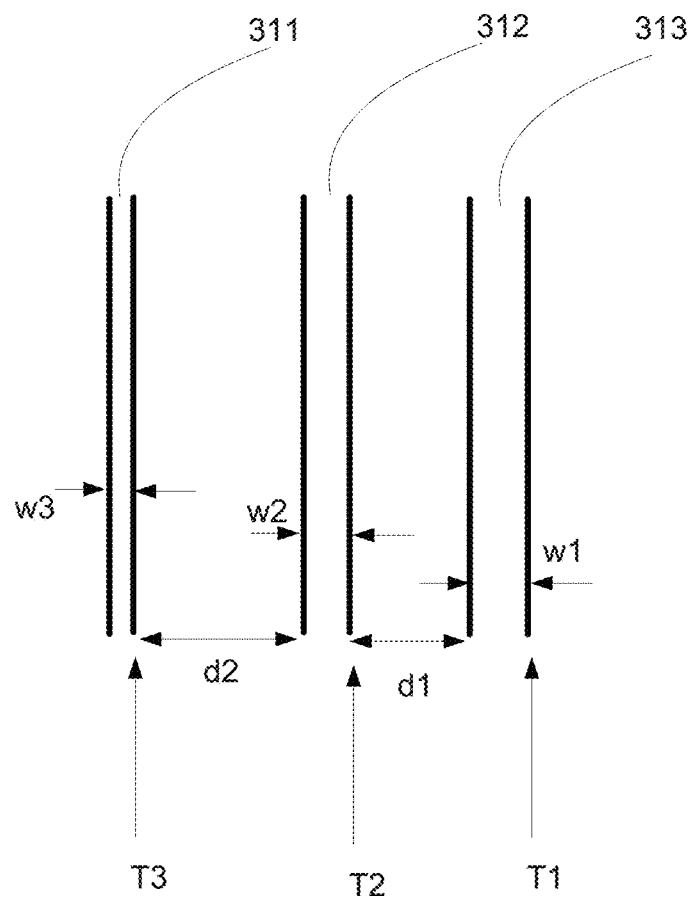
FIG. 6 shows an arrangement of three regions of interest, according to an exemplary embodiment.

Detection of the moving object in steps 435 and 445 may be based on the time information and/or the color data obtained from the image frames. FIG. 6 schematically shows an arrangement of the ROIs in the image frames. As shown in FIGS. 3A-3C, when moving object 305 is moving from the right to the left in the field of view, moving object 305 may consecutively enter right ROI 313, center ROI 312, and left ROI 311 at $T_1$, $T_2$, and $T_3$. For illustrative purposes, the three time instances $T_1$, $T_2$, and $T_3$ are shown in FIG. 6. The distance between right ROI 313 and center ROI 312 is $d_1$, and the distance between center ROI 312 and left ROI 311 is $d_2$. The width of right ROI 313 is $w_1$, the width of center ROI 312 is $w_2$, and the width of left ROI 311 is $w_3$. Distance $d_1$ may be the same as or different from distance $d_2$. Widths $w_1$, $w_2$, $w_3$ may be the same as each other, or may be different from each other (e.g., at least two being different). Distance $d_1$ and $d_2$, and widths $w_1$, $w_2$, and $w_3$ may be known parameters when the arrangement of the ROIs in the image frames is set. A first time interval $T_{i1}$ for moving object 305 to travel from right ROI 313 to center ROI 312 in distance $d_1$ may be determined from $T_{i1}=(T_2-T_1)*d_1/(d_1+w_1)$. A second time interval $T_{i2}$ for moving object 305 to travel from center ROI 312 to left ROI 311 in distance $d_2$ may be determined from $T_{i2}=(T_3-T_2)*d_2/(d_2+w_2)$.

Processor 210 may compare first time interval $T_{i1}$ with a first predetermined time delay $T_{d1}$, and compare second time interval $T_{i2}$ with a second predetermined time delay $T_{d2}$. In some embodiments, $T_{d1}$ is the same as $T_{d2}$. In some embodiments, $T_{d1}$ and $T_{d2}$ are different from each other. In some embodiments, each of time delays $T_{d1}$ and $T_{d2}$ is predetermined based on distance $d_1$ or $d_2$ between the ROIs. For example, first predetermined time delay $T_{d1}$ may be proportional to distance $d_1$, and second predetermined time delay $T_{d2}$ may be proportional to distance $d_2$. When $d_1$ is larger than $d_2$, $T_{d1}$ may be pre-set to be larger than $T_{d2}$. Processor 210 may detect moving object 305 moving across right ROI 313, center ROI 312, and left ROI 311 when both a time requirement and a color requirement are satisfied. The time requirement may be that first time interval $T_{i1}$ is less than first predetermined time delay $T_{d1}$ (i.e., $T_{i1}<T_{d1}$) and second time interval $T_{i2}$ is less than second predetermined time delay $T_{d2}$ (i.e., $T_{i2}<T_{d2}$). The color requirement may be that the color difference between the color difference vectors, e.g., ($V_{c2\_L}$–$V_{c2\_C}$), and ($V_{c2\_C}$–$V_{c2\_R}$), is small, or in other words, when the color vectors for the ROIs are substantially the same. Additionally, in some embodiments, processor 210 may also calculate the color difference vector between the right and left ROIs, e.g., ($V_{c2\_L}$–$V_{c2\_R}$), and compare this vector with the above two color difference vectors.

In step 435, processor 210 may determine that moving object 305 is moving from right to the left in the field of view of camera 105 based on the time sequence of changes occurred to right, center, and left ROIs 313, 312, and 311. For example, as shown in FIGS. 3A-3C, the changes occurred to right ROI 313 first, then followed by center ROI 312, and left ROI 311. The time sequence of changes is indicated by $T_1$ being earlier than $T_2$, and $T_2$ being earlier than $T_3$. Processor 210 may determine that first time interval $T_{i1}$ is less than first predetermined time delay $T_{d1}$, and second time interval $T_{i2}$ is less than second predetermined time delay $T_{d2}$. In addition, processor 210 may determine that the color difference between the color vectors for the ROIs is small (or that the color vectors are substantially the same), as discussed above in connection with step 430 in FIG. 4. In some embodiments, when processor 210 determines that both the time requirement and the color requirement are satisfied, processor 210 may detect moving object 305 in the image frames based on a determination that the same object 305 moved across the ROIs. In some embodiments, the color requirement may be optional. When processor 210 determines that the time requirement is satisfied, processor 210 may detect moving object 305 in the image frames regardless of whether the color requirement is satisfied. Satisfying the color requirement may increase the accuracy of moving object detection.

Still referring to FIG. 4, in addition to or as an alternative to step 435, processor 210 may determine that moving object 305 is moving from left to the right in the field of view of camera 105 based on the sequence of changes which occurred to left, center, and right ROIs 311, 312, and 313, and the color data for the ROIs (step 445). The process for detecting the moving object that moves from the left to the right in the field of view is similar to that discussed above in connection with step 435. Thus, the detailed process performed in step 445 is not repeated. In some embodiments, when a time requirement and a color requirement similar to those discussed above are both satisfied, processor 210 may detect moving object 305 that moves from the left to the right. In some embodiments, the color requirement may be optional.

As shown in Fig, 4, processor 210 may determine a moving speed of the left moving object (step 440). Alternatively or additionally, processor 210 may determine a moving speed of the right moving object (step 450). Referring to FIG. 6 and using the left moving object shown in FIGS. 3A-3C as an example, the moving speed from right ROI 313 to center ROI 312 may be determined as $S_{L1}=(w_1+d_1)/(T_2-T_1)$, and from center ROI 312 to left ROI 311 may be determined as $S_{L2}=(w_2+d_2)/(T_3-T_2)$. The moving speed of moving object 305 may be determined based on speeds $S_{L1}$ and $S_{L2}$. For example, the moving speed of moving object 305 may be determined as the average of $S_{L1}$ and $S_{L2}$. The average speed may be used as a tracking speed for tracking moving object 305. Determining the moving speed of the right moving object may be carried out in a similar manner, which is not repeated.

As shown in FIG. 4, after detecting the moving object and its moving direction, and determining the moving speed, processor 210 may initiate tracking of the moving object (step 455) based on the moving direction and speed. In some embodiments, processor 210 may send a control signal to motor 120 to drive motor 120, such that motor 120 may adjust an angle of camera 105 to follow moving object 305 in the moving direction. In other words, motor 120 may adjust an angle (e.g., a panning angle and/or a tilt angle) of camera 105 to change the field of view of the camera, such that moving object 305 is maintained within the field of view. The speed of driving motor 120 (or referred to as a tracking speed) may be based on the moving speed of the moving object. For example, the tracking speed may be such that the field of view moves at the same speed as the object moving speed.

As shown in FIG. 3C, when processor 210 identifies moving object 305 and determines to track the moving object 305, tracking indicator 310 may be superimposed on the image frame displayed on a display, and may follow moving object 305 as moving object 305 continues to move to the left. Tracking indicator 310 may be optional, that is, in some embodiments, tracking indicator 310 may not be displayed.

Figure 7:
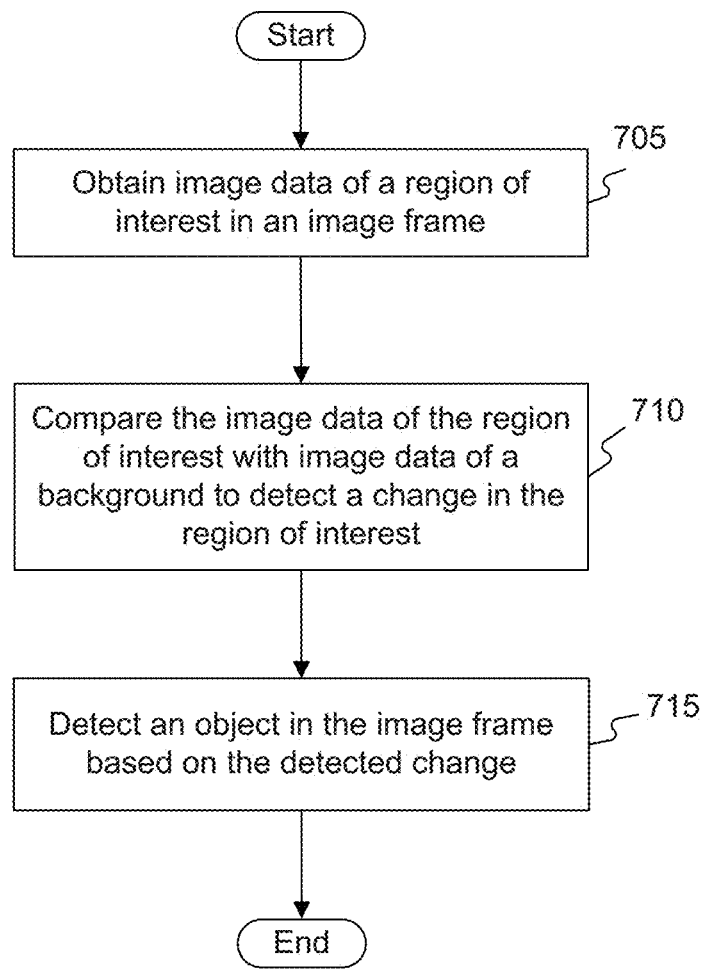
FIG. 7 is a flowchart illustrating a method for detecting an object, according to an exemplary embodiment.

FIG. 7 is a flowchart illustrating a method 700 for detecting an object from a plurality of image frames. Method 700 may be performed by processor 210. Method 700 may include obtaining image data of a region of interest (ROI) in an image frame (step 705). For example, processor 210 may obtain image data (which may include brightness data and/or color data of pixels) of right ROI 313 from image frame 301 shown in FIG. 3A. Processor 210 may obtain image data (which may include brightness data and/or color data of pixels) of center ROI 312 from image frame 302 shown in FIG. 3B. Processor 210 may obtain image data (which may include brightness data and/or color data of pixels) of left ROI 311 from image frame 303 shown in FIG. 3C. Processor 210 may compare the image data of the region of interest with image data of a background image to detect a change in the region of interest (step 710). For example, processor 210 may compare the brightness vector of right ROI 313 with the brightness vector of a corresponding background image using methods described above, for example, in connection with FIG. 4. Processor 210 may detect an object, such as a moving object, in the image frame based on the detected change (step 715). Details about the methods for detecting an object, such as a moving object, from the image frame are discussed above and are not repeated here. Method 700 may include one or more steps included in method 400 and method 500.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device, comprising:
   a memory configured to store instructions; and
   a processor configured to execute the instructions to:
      obtain image data of a plurality of predetermined regions of interest within a plurality of image frames, wherein at least one of the regions of interest is arranged at the same position in every one of the plurality of image frames;
      compare the image data of the regions of interest with image data of backgrounds to detect changes in the regions of interest;
      obtain time data indicating when the detected changes occurred in the regions of interest;
      compare the time data of the detected changes to determine a time sequence of the detected changes in the regions of interest; and
      determine a movement characteristic of an object in the plurality of image frames based on the determine time sequence of the detected changes in the regions of interest.

2. The device of claim 1, wherein the processor is further configured to execute the instructions to detect the object in the plurality of image frames based on:
   the time data indicating when the detected changes occurred in the regions of interest, and
   at least one of brightness data or color data obtained from locations within the regions of interest where the changes occurred.

3. The device of claim 1, wherein the processor is further configured to execute the instructions to:
   determine, based on the comparison of the image data of the regions of interest with the image data of the backgrounds, a difference between the image data of at least one of the regions of interest and the image data of at least one of the backgrounds.

4. The device of claim 3, wherein the processor is further configured to execute the instructions to:
   determine a difference vector between a first vector storing the image data of the at least one region of interest and a second vector storing the image data of the at least on background; and
   determine whether the difference vector satisfies a predetermined condition.

5. The device of claim 3, wherein the processor is further configured to execute the instructions to:

determine that the difference is smaller than a predetermined difference value; and
update the image data of the at least one background using the image data of the at least one region of interest.

6. The device of claim 5, wherein updating the image data of the at least one background includes:
updating the image data of the at least one background using image data of the at least one region of interest from a predetermined number of image frames.

7. The device of claim 3, wherein the processor is further configured to execute the instructions to:
determine that the difference is greater than or equal to a predetermined difference value;
determine a number of image frames, from a predetermined plurality of image frames, in which the difference is greater than or equal to the predetermined difference value; and
when the number of image frames is greater than or equal to a predetermined frame number value, update the image data of the at least one background using the image data of the at least one region of interest from the predetermined plurality of image frames.

8. The device of claim 1, wherein the processor is further configured to execute the instructions to:
determine, from the comparison of the image data of the regions of interest with the image data of the backgrounds, a location in each of the plurality of regions of interest where a change has occurred;
obtain color data at the location in different regions of interests from a different image frames; and
compare color data obtained from the different regions of interest in the different image frames.

9. The device of claim 1, wherein the processor is further configured to execute the instructions to:
determine a moving direction and a moving speed of the object across the regions of interest based on the time sequence of the detected changes in the regions of interest.

10. The device of claim 9, wherein the processor is further configured to execute the instructions to:
calculate a plurality of time intervals based on a plurality of pairs of adjacent time instances;
compare the time intervals with a plurality of predetermined time delay values; and
determine that a same object is moving across the regions of interest in the moving direction when:
each of the time intervals is less than each of the corresponding predetermined time delay values, and
a difference in the color data obtained from the different regions of interest in the different image frames is smaller than a predetermined color value.

11. The device of claim 10, wherein the processor is further configured to execute the instructions to initiate tracking of the object in the moving direction by sending a control signal to drive a motor to turn a camera in the moving direction to follow the object.

12. The device of claim 11, wherein the processor is further configured to execute the instructions to determine the moving speed of the object based on the time instances and distances between adjacent regions of interest, and wherein the control signal controls the speed of driving the motor based on the moving speed.

13. The device of claim 1, wherein the processor is further configured to execute the instructions to:
obtain a brightness matrix including brightness values of pixels included in at least one of the regions of interest; and
transform the brightness matrix into a brightness vector, each row of the vector being calculated based on brightness values of all columns in the row,
wherein the image data of the at least one region of interest is represented by the brightness vector.

14. The device of claim 13, wherein the processor is further configured to execute the instructions to:
obtain a color data matrix including color data of pixels included in the at least one region of interest; and
transform the color data matrix into a color value vector, each row of the vector being a sum of color values of all columns in the row,
wherein the image data associated with the at least one region of interest includes the color value vector.

15. The device of claim 13, wherein the processor is further configured to execute the instructions to:
obtain an initial brightness vector as the image data of at least one of the backgrounds, based on brightness vectors obtained from a predetermined number of image frames.

16. The device of claim 1, wherein the plurality of image frames comprises three regions of interest.

17. A method for tracking an object, comprising:
obtaining image data of a plurality of predetermined regions of interest within a plurality of image frames, wherein at least one of the regions of interest is arranged at the same position in every one of the plurality of image frames;
comparing the image data of the regions of interest with image data of backgrounds to detect changes in the regions of interest;
obtaining time data indicating when the detected changes occurred in the regions of interest;
comparing the time data of the detected changes to determine a time sequence of the detected changes in the regions of interest and
tracking movement of an object in the plurality of image frames based on the determined time sequence of the detected changes in the regions of interest.

18. The method of claim 17, wherein tracking movement of the object in the plurality of image frames includes detecting the object based on: the time data indicating when the detected changes occurred in the regions of interest, and color data obtained from a location within the plurality of regions of interest.

19. A non-transitory computer-readable storage medium storing instructions that, when executed by a processor, cause the processor to perform a method for tracking an object, the method comprising:
obtaining image data of a plurality of predetermined regions of interest within a plurality of image frames, wherein at least one of the regions of interest is arranged at the same position in every one of the plurality of image frames;
comparing the image data of the regions of interest with image data of backgrounds to detect changes in the regions of interest;
obtaining time data indicating when the detected changes occurred in the regions of interest;
comparing the time data of the detected changes to determine a time sequence of the detected changes in the regions of interest; and
tracking movement of an object in the plurality of image frames based on the determine time sequence of the detected changes in the regions of interest.

20. The non-transitory computer-readable storage medium of claim 19, wherein tracking movement of the object in the plurality of image frames includes detecting the object based on: the time data indicating when the detected changes occurred in the regions of interest, and color data obtained from a location within the plurality of regions of interest.

* * * * *